United States Patent
Goto et al.

(10) Patent No.: US 10,668,449 B2
(45) Date of Patent: Jun. 2, 2020

(54) OXYGEN STORAGE MATERIAL AND METHOD FOR PRODUCING THE SAME

(71) Applicant: TOYOTA JIDOSHA KABUSHIKI KAISHA, Toyota-shi, Aichi (JP)

(72) Inventors: Yoshihiro Goto, Nagakute (JP); Akira Morikawa, Nagakute (JP); Masahide Miura, Toyota (JP); Nobuyuki Takagi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/392,800

(22) Filed: Apr. 24, 2019

(65) Prior Publication Data
US 2019/0321806 A1   Oct. 24, 2019

(30) Foreign Application Priority Data
Apr. 24, 2018 (JP) ................... 2018-083062

(51) Int. Cl.
*B01J 23/00* (2006.01)
*B01J 23/10* (2006.01)
(Continued)

(52) U.S. Cl.
CPC .......... *B01J 23/002* (2013.01); *B01D 53/94* (2013.01); *B01J 37/08* (2013.01);
(Continued)

(58) Field of Classification Search
CPC ........ B01J 21/063; B01J 21/066; B01J 23/10; B01J 37/10
(Continued)

(56) References Cited

U.S. PATENT DOCUMENTS 5,447,705 A * 9/1995 Petit ................ B01J 23/002
                                              423/418.2
6,458,741 B1 * 10/2002 Roark ................ A62D 3/38
                                              423/245.3
(Continued)

FOREIGN PATENT DOCUMENTS

JP    2007-260641 A    10/2007
JP    2015-182931 A    10/2015
(Continued)

OTHER PUBLICATIONS

S. T. Aruna et al.; "Combustion Synthesis and Properties of Nanostructured Ceria-Zirconia Solid Solutions"; NanoStructured Materials; vol. 10, No. 6; pp. 955-964; 1998.
(Continued)

*Primary Examiner* — Cam N. Nguyen
(74) *Attorney, Agent, or Firm* — Dickinson Wright PLLC

(57) ABSTRACT

An oxygen storage material comprises a Ce—Zr-Ln-Ti-based composite oxide containing cerium (Ce), zirconium (Zr), a rear-earth element (Ln: excluding cerium), and titanium (Ti), wherein
at least part of the rear-earth element and at least part of the titanium are solid-dissolved in a composite oxide of the cerium and the zirconium, and
the Ce—Zr-Ln-Ti-based composite oxide has a composition expressed by the following chemical formula (1):

$$Ce_{a-x}Ln_xZr_{b-y}Ti_yO_\delta \quad (1),$$

where a, b, x, and y are numbers satisfying conditions of a=0.4 to 0.6, b=0.4 to 0.6, x=0 to a (exclusive of x=0 and x=a), y=0 to 0.3 (exclusive of y=0), and a+b=1, and δ is a number of 1.7 to 2.2.

8 Claims, 2 Drawing Sheets

* Superlattice Peak Originated From Cation Ordering

(51) Int. Cl.
  *B01J 21/06* (2006.01)
  *B01J 37/08* (2006.01)
  *B01D 53/94* (2006.01)
  *B01J 35/02* (2006.01)
  *B01J 35/10* (2006.01)

(52) U.S. Cl.
  CPC ............ *B01D 2255/2065* (2013.01); *B01D 2255/20707* (2013.01); *B01D 2255/20715* (2013.01); *B01D 2255/407* (2013.01); *B01D 2255/908* (2013.01); *B01J 35/023* (2013.01); *B01J 35/1009* (2013.01); *B01J 35/1014* (2013.01); *B01J 2523/3712* (2013.01); *B01J 2523/47* (2013.01); *B01J 2523/48* (2013.01)

(58) Field of Classification Search
  USPC ................................ 502/302–304, 349, 350
  See application file for complete search history.

(56) References Cited

U.S. PATENT DOCUMENTS

| | | | | |
|---|---|---|---|---|
| 6,831,036 | B1* | 12/2004 | Yamazaki | B01D 53/945 502/327 |
| 7,202,194 | B2* | 4/2007 | Muhammed | C01G 25/006 502/304 |
| 7,527,776 | B2* | 5/2009 | Golden | B01D 53/9418 423/239.1 |
| 7,641,875 | B1* | 1/2010 | Golden | B01D 53/945 423/213.5 |
| 7,879,759 | B2* | 2/2011 | Augustine | B01J 23/002 502/350 |
| 8,043,992 | B2* | 10/2011 | Hatanaka | B01D 53/945 423/594.12 |
| 8,435,920 | B2* | 5/2013 | White | B01J 23/002 252/373 |
| 8,802,582 | B2* | 8/2014 | Malyala | B01D 53/9418 502/63 |
| 9,011,784 | B2* | 4/2015 | Golden | C01G 25/02 422/177 |
| 9,012,353 | B2* | 4/2015 | Golden | F01N 3/101 502/258 |
| 10,258,964 | B2* | 4/2019 | Murota | C01G 25/00 |
| 2004/0186016 | A1* | 9/2004 | Bog | B01D 53/945 502/304 |
| 2007/0179054 | A1* | 8/2007 | Akamine | B01J 23/63 502/304 |
| 2009/0215614 | A1* | 8/2009 | Chane-Ching | C01G 25/00 502/304 |
| 2010/0234217 | A1 | 9/2010 | Ishii | |
| 2013/0115144 | A1* | 5/2013 | Golden | C04B 35/486 422/170 |
| 2017/0274347 | A1 | 9/2017 | Morikawa et al. | |
| 2017/0282123 | A1 | 10/2017 | Kumatani et al. | |

FOREIGN PATENT DOCUMENTS

| | | |
|---|---|---|
| JP | 2017030990 A | 2/2017 |
| JP | 2017-171544 A | 9/2017 |
| JP | 2017186225 A | 10/2017 |
| JP | 2018-131365 A | 8/2018 |

OTHER PUBLICATIONS

Y. Goto et al.; "Cation ordered Ce0.5Zr0.5-xTixO2 with high oxygen storage capacity"; Annual Meeting of the Ceramic Society of Japan—2018; conference abstracts; Mar. 15-17, 2018.

\* cited by examiner

OXYGEN STORAGE MATERIAL AND METHOD FOR PRODUCING THE SAME

RELATED APPLICATION

This application claims priority to Japanese Patent Application No. 2018-083062, filed on Apr. 24, 2018, including the specification, drawings and abstract, the entire disclosure of which is incorporated herein by reference.

BACKGROUND OF THE INVENTION

Field of the Invention

The present invention relates to an oxygen storage material and a method for producing the same.

Related Background Art

What is termed a three-way catalyst is known as a catalyst for purification of exhaust gas capable of oxidizing carbon monoxide (CO) and hydrocarbon (HC) and simultaneously reducing nitrogen oxide (NOx) in exhaust gas emitted from internal combustion engines such as automotive engines.

For purification of an exhaust gas using a catalyst for purification of exhaust gas, it is known to use, as a support or a promoter for the catalyst for purification of exhaust gas, a material having an oxygen storage capacity (OSC), that is, a capacity to store oxygen when the concentration of oxygen in the exhaust gas is high and release oxygen when the concentration of oxygen in the exhaust gas is low in order to absorb variations in the concentration of oxygen in the exhaust gas and to thus enhance the exhaust gas purifying capability.

The use of ceria as such an oxygen storage material having OSC has been conventionally preferred, and various types of composite oxides containing ceria have been studied in recent years. As a result, there have been developed various ceria-zirconia-based composite oxides obtained through various methods termed a co-deposited method, a reverse co-deposited method, a hydrothermal synthesis method, a fusion method, a solid phase method, and so on.

For example, Japanese Unexamined Patent Application Publication No. 2015-182931 (Patent Literature 1) discloses a method for producing a ceria-zirconia-based composite oxide through a fusion method mentioned above, the ceria-zirconia-based composite oxide containing: cerium; zirconium; and a transition metal element such as iron, manganese, cobalt, nickel, or copper other than cerium and zirconium, and containing a pyrochlore phase as a crystal structure.

In addition, Japanese Unexamined Patent Application Publication No. 2007-260641 (Patent Literature 2) discloses a catalyst for purification of exhaust gas in which the surface of an oxygen storage/release material on which a noble metal is supported is coated with a sulfuric acid compound, and the oxygen storage/release material is ceria or a solid solution of a ceria with at least one of zirconia, titania, and alumina, In addition, Japanese Unexamined Patent Application Publication No. 2017-171544 (Patent Literature 3) discloses an oxygen storage material in which three kinds of pyrochlore-type composite oxides, namely, a ceria-zirconia composite oxide, a lantana-zirconia composite oxide, and a ceria-zirconia-lantana composite oxide coexist, the oxygen storage material containing first secondary particles composed of the pyrochlore-type ceria-zirconia composite oxide and the pyrochlore-type ceria-zirconia-lantana composite oxide, and second secondary particles composed of the pyrochlore-type lantana-zirconia composite oxide and the pyrochlore-type ceria-zirconia-lantana composite oxide.

However, in recent years, the required properties for the catalyst for purification of exhaust gas have been becoming higher and higher, and there has been a demand for oxygen storage materials that are capable of exhibiting a good oxygen storage capacity (OSC) even at a relatively low temperature of about 400° C., and have such good heat resistance as to achieve a sufficient reduction in deterioration of the oxygen storage capacity under exposure to a high temperature. Hence, the conventional oxygen storage materials disclosed in Patent Literatures 1 to 3 are not necessarily sufficient any more.

CITATION LIST

Patent Literature

[PTL 1] Japanese Unexamined Patent Application Publication No. 2015-182931
[PTL 2] Japanese Unexamined Patent Application Publication No. 2007-260641
[PTL 3] Japanese Unexamined Patent Application Publication No. 2017-171544

SUMMARY OF THE INVENTION

Problems to be Solved by the Invention

The present invention has been made in view of the above-described problems of the conventional techniques, and has an object to provide an oxygen storage material that is capable of exhibiting a good oxygen storage capacity (OSC) even at a relatively low temperature of about 400° C. and has such good heat resistance as to achieve a sufficient reduction in deterioration of the oxygen storage capacity under exposure to a high temperature, and to provide a method for producing the same.

Means for Solving the Problems

The present inventors have conducted intensive studies in order to achieve the above-described object. As a result, the present inventors have found that, when titanium and a rear-earth element other than cerium are selected as elements to be added to a ceria-zirconia-based composite oxide and a composite oxide containing these elements at a predetermined composition is produced through a so-called solution combustion synthesis method, the titanium can be solid-dissolved together with the rear-earth element (excluding cerium) in the ceria-zirconia-based composite oxide, even though it has been difficult to solid-dissolve titanium by the other methods termed the co-deposited method, the reverse co-deposited method, the hydrothermal synthesis method, the fusion method, the solid phase method, and so on. This finding has enabled a production of an oxygen storage material which is capable of exhibiting a good oxygen storage capacity (OSC) even at a relatively low temperature of about 400° C. and has such good heat resistance as to achieve a sufficient reduction in deterioration of the oxygen storage capacity under exposure to a high temperature, and has led to the completion of the present invention.

The oxygen storage material of the present invention is an oxygen storage material comprising a Ce—Zr-Ln-Ti-based composite oxide containing cerium (Ce), zirconium (Zr), a rear-earth element (Ln: excluding cerium), and titanium (Ti), wherein at least part of the rear-earth element and at least part of the titanium are solid-dissolved in a composite oxide of the cerium and the zirconium, and the Ce—Zr-Ln-Ti-based composite oxide has a composition expressed by the following chemical formula (1):

$$Ce_{a-x}Ln_xZr_{b-y}Ti_yO_\delta \qquad (1),$$

where a, b, x, and y are numbers satisfying conditions of a=0.4 to 0.6, b=0.4 to 0.6, x=0 to a (exclusive of x=0 and x=a), y=0 to 0.3 (exclusive of y=0), and a+b=1, and δ is a number of 1.7 to 2.2.

In addition, the method for producing an oxygen storage material of the present invention is a method comprising:
mixing, in a solvent,
at least one cerium compound selected from the group consisting of chloride, nitrate, sulfate, acetate and oxide of cerium,
at least one zirconium compound selected from the group consisting of chloride, nitrate, sulfate, acetate and oxide of zirconium,
at least one rear-earth element-containing compound selected from the group consisting of chloride, nitrate, sulfate, acetate and oxide of a rear-earth element other than cerium,
at least one titanium compound selected from the group consisting of chloride, nitrate, sulfate, acetate and oxide of titanium, and
a hydrophilic organic compound; and
obtaining the oxygen storage material of the present invention comprising the above-specified Ce—Zr-Ln-Ti-based composite oxide from the obtained mixture through a solution combustion synthesis.

According to the oxygen storage material and the method for producing the same of the present invention, in an X-ray diffraction pattern of the Ce—Zr-Ln-Ti-based composite oxide obtained using CuKα by an X-ray diffraction measurement, a ratio ($I_{111}/I_{222}$) of an intensity ($I_{111}$) of a superlattice peak of a diffraction line attributed to a (111) plane to an intensity ($I_{222}$) of a main peak of the diffraction line attributed to a (222) plane preferably satisfies the following condition (2):

$$1 \leq \{(I_{111}/I_{222}) \times 100\} \leq 5 \qquad (2).$$

In addition, according to the oxygen storage material and the method for producing the same of the present invention, a specific surface area of the Ce—Zr-Ln-Ti-based composite oxide is preferably 1 to 50 m²/g, and an average crystal size in the Ce—Zr-Ln-Ti-based composite oxide is preferably 10 to 100 nm.

Moreover, according to the oxygen storage material and the method for producing the same of the present invention, the Ce—Zr-Ln-Ti-based composite oxide has preferably a cation-ordered structure, and the cation-ordered structure is more preferably of a pyrochlore-type.

Here, a reason that the oxygen storage material and the method for producing the same according to the present invention can achieve the above object has not been entirely clarified, but the present inventors consider as follows. Specifically, in the method for producing an oxygen storage material of the present invention, titanium and a rear-earth element other than cerium are selected as elements to be added to a ceria-zirconia-based composite oxide and a composite oxide that contains these elements at a predetermined composition (Ce—Zr-Ln-Ti-based composite oxide) is produced through a so-called solution combustion synthesis method. This makes it possible to solid-dissolve the titanium together with the rear-earth element (excluding cerium) in the ceria-zirconia composite oxide. Thus, in the composite oxide forming the oxygen storage material of the present invention, a difference in ionic radius between the Zr site where the titanium is solid-dissolved and the Ce site where the rear-earth element is solid-dissolved causes cation ordering and forms an oxygen site in which the bonding strength is relatively weak. In addition, the rear-earth element solid-dissolved in the Ce site enhances the heat resistance. The present inventors have come to the conclusion that the above factors seem to enable a production of an oxygen storage material of the present invention which is capable of exhibiting a good oxygen storage capacity (OSC) even at a relatively low temperature of about 400° C. and has such good heat resistance as to achieve a sufficient reduction in deterioration of the oxygen storage capacity under exposure to a high temperature.

Effects of the Invention

According to the present invention, it is possible to obtain an oxygen storage material and a method for producing the same, the oxygen storage material being capable of exhibiting a good oxygen storage capacity (OSC) even at a relatively low temperature of about 400° C. and having such good heat resistance as to achieve a sufficient reduction in deterioration of the oxygen storage capacity under exposure to a high temperature.

DETAILED DESCRIPTION OF THE PREFERRED EMBODIMENTS

Figure 1:
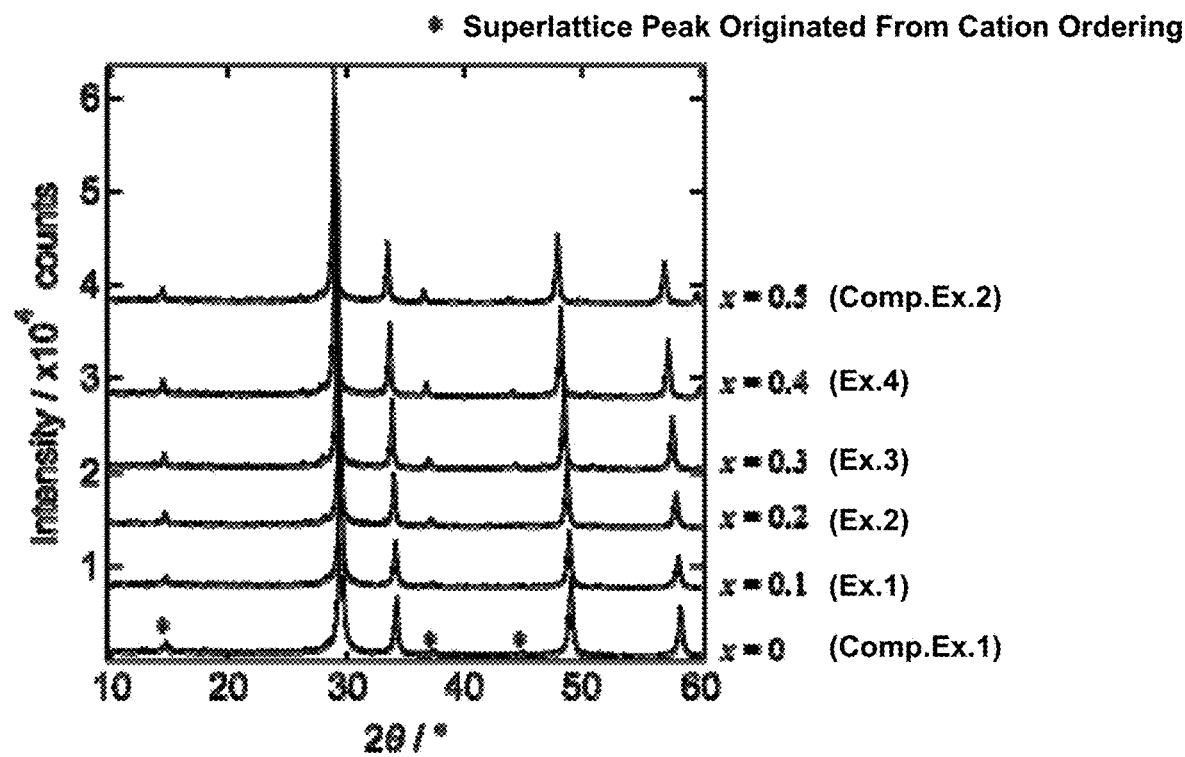
FIG. 1 is a graph presenting X-ray diffraction patterns (XRD full angular patterns) of composite oxides obtained in Examples 1 to 4 and Comparative Examples 1 and 2 (before Heat-Resistance Test).

Hereinafter, the present invention is described in detail based on preferred embodiments of the present invention.

First, an oxygen storage material of the present invention is described. Specifically, the oxygen storage material of the present invention is an oxygen storage material comprising a Ce—Zr-Ln-Ti-based composite oxide containing cerium (Ce), zirconium (Zr), a rear-earth element (Ln: excluding cerium), and titanium (Ti), at least part of the rear-earth element and at least part of the titanium are solid-dissolved in a composite oxide of the cerium and the zirconium, and the Ce—Zr-Ln-Ti-based composite oxide has a composition expressed by the following chemical formula (1):

$$Ce_{a-x}Ln_xZr_{b-y}Ti_yO_\delta \qquad (1),$$

where a, b, x, and y are numbers satisfying conditions of a=0.4 to 0.6, b=0.4 to 0.6, x=0 to a (exclusive of x=0 and x=a), y=0 to 0.3 (exclusive of y=0), and a+b=1, and δ is a number of 1.7 to 2.2).

The composite oxide according to the present invention is a composite oxide containing cerium (Ce), zirconium (Zr), a rear-earth element (Ln) other than cerium, and titanium (Ti). Even when titanium is added to a ceria-zirconia composite oxide, the titanium does not contribute to the enhancement of oxygen storage capacity (OSC) because it is difficult to solid-dissolve the titanium in the ceria-zirconia composite oxide through the methods termed the co-deposited method, the reverse co-deposited method, the hydrothermal synthesis method, the fusion method, and the solid phase method. In contrast, in the present invention, the composite oxide is produced by a so-called solution combustion synthesis method as described later, and thereby the titanium can be solid-dissolved together with the rear-earth element (excluding cerium) in the ceria-zirconia composite oxide. In this case, the obtained composite oxide achieves enhancements of the OSC at a low temperature and the heat resistance. For these purposes, in the composite oxide according to the present invention, at least part of the rear-earth element and at least part of the titanium need to be solid-dissolve in the composite oxide of the cerium and the zirconium.

Here, usable elements as the rear-earth element (Ln) other than cerium include lanthanum (La), scandium (Sc), yttrium (Y), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Among them, the lanthanum (La) is particularly preferable from the viewpoint that the lanthanum (La) has an ionic radius larger than that of Ce and tends to more enhance the OSC at a low temperature and the heat resistance when being solid-dissolved.

In addition, a state where at least part of the rear-earth element and at least part of the titanium are solid-dissolved in the composite oxide of the cerium and the zirconium and the degree of the solid-dissolution can be confirmed by:

(i) an increase in the lattice parameter with an increase in a content ratio of the rear-earth element and the titanium (composition ratio [at %]) in accordance with Vegard's law; and (ii) an increase in the ratio ($I_{111}/I_{222}$) of an intensity ($I_{111}$) of a superlattice peak of a diffraction line attributed to the (111) plane to an intensity ($I_{222}$) of a main peak of the diffraction line attributed to the (222) plane along with an increase in the content ratio of the rear-earth element and the titanium (composition ratio [at %]).

In the oxygen storage material of the present invention, at least part of the rear-earth element and at least part of the titanium just have to be solid-dissolved in the composite oxide of the cerium and the zirconium. However, from the viewpoint that the oxygen storage capacity (OSC) and the heat resistance are further enhanced, it is preferable that 90 at % or more of the rear-earth element and the titanium be solid-dissolved in the composite oxide of the cerium and the zirconium, and it particularly preferable that 95 at % or more of the rear-earth element and the titanium be solid-dissolved in the composite oxide. In this regard, a state where 90 at % or more (particularly preferably, 95 at % or more) of the rear-earth element and the titanium is solid-dissolved in the composite oxide of the cerium and the zirconium as described above can be confirmed by an X-ray diffraction (XRD) measurement, to be described later, observing the absence of peaks corresponding to the rear-earth element (Ln) and the titanium (Ti) oxides ($LnTiO_4$, $TiO_2$, $Ln_2O_3$) that are not solid-dissolved (the peaks that appear at 2θ angles of 29.9 ($LnTiO_4$), 27.4 ($TiO_2$), and 29.9 ($Ln_2O_3$) in an X-ray diffraction pattern using CuKα), in other words, confirming that the amounts of the oxides not solid-dissolved are equal to or lower than a detection limit. In this connection, a measurement method employable as such an X-ray diffraction (XRD) measurement includes measuring under conditions of 40 KV, 40 mA, and 2θ=5°/min with the CuKα ray using a measuring device under the trade name "RINT-Ultima" manufactured by Rigaku Corporation. In addition, the "peak" in a diffraction line refers to one having a height of 30 cps or more from the base line to the peak top.

Such a composite oxide according to the present invention has a composition expressed by the following chemical formula (1):

$$Ce_{a-x}Ln_xZr_{b-y}Ti_yO_\delta \qquad (1),$$

where a, b, x, and y are numbers satisfying conditions of a=0.4 to 0.6, b=0.4 to 0.6, x=0 to a (exclusive of x=0 and x=a), y=0 to 0.3 (exclusive of y=0), and a+b=1, and δ is a number of 1.7 to 2.2.

If the content of Ce is less than the lower limit, a sufficient OSC is unlikely to be obtained. On the other hand, if the content of Ce is more than the upper limit, the composite oxide cannot be obtained as a single phase. In addition, if the content of Zr is less than the lower limit, the sufficient OSC is unlikely to be obtained. On the other hand, if the content of Zr is more than the upper limit, the composite oxide cannot be obtained as a single phase. Moreover, if the content of the rear-earth element (Ln) is less than the lower limit, an effect of enhancing the heat resistance produced by the addition of the element (Ln) may not be obtained sufficiently. On the other hand, if the content of the rear-earth element (Ln) is more than the upper limit, the sufficient OSC is not obtained. In addition, if the content of the titanium (Ti) is less than the lower limit, an effect of enhancing the heat resistance produced by the addition of the Ti may not be obtained sufficiently. On the other hand, if the content of the titanium (Ti) is more than the upper limit, the oxides not solid-dissolved are deposited, which results in a failure to obtain sufficient effects of enhancing the OSC and the heat resistance.

In addition, from the same viewpoints, a is more preferably 0.5, b is more preferably 0.5, x is more preferably 0.1 to 0.4 (particularly preferably 0.2 to 0.3), and y is more preferably 0.05 to 0.2.

Note that δ is the number of oxygen atoms in the composition. Calculated from the valences of the contained elements, δ varies within a range of 1.7 to 2.2, where δ=2 is more preferable.

Further, in the composite oxide (the Ce—Zr-Ln-Ti-based composite oxide) according to the present invention, the ratio ($I_{111}/I_{222}$) of the intensity ($I_{111}$) of the superlattice peak of the diffraction line attributed to the (111) plane to the intensity ($I_{222}$) of the main peak of the diffraction line attributed to the (222) plane obtained from the X-ray diffraction pattern using CuKα by the X-ray diffraction measurement preferably satisfies the following condition (2):

$$1 \leq \{(I_{111}/I_{222}) \times 100\} \leq 5 \qquad (2).$$

If the intensity ratio ($I_{111}/I_{222}$) is less than the lower limit, the effects of enhancing the OSC and the heat resistance by the cation-ordered structure formed by the solid-dissolution of the rear-earth element and the titanium tend not to be obtained sufficiently. On the other hand, if the intensity ratio ($I_{111}/I_{222}$) is more than the upper limit, the composite oxide tends to easily cause phase separation within a temperature range (400 to 600° C.) for measuring the OSC. In addition, from the viewpoint that more sufficient enhancement of the OSC can be achieved, the intensity ratio $\{(I_{111}/I_{222}) \times 100\}$ is more preferably 2 or higher. On the other hand, from the viewpoint that the phase separation within the temperature range (400 to 600° C.) for measuring the OSC can be more sufficiently prevented, the intensity ratio $\{(I_{111}/I_{222}) \times 100\}$ is more preferably 4 or lower.

Then, an average crystal size in the composite oxide (the Ce—Zr-Ln-Ti-based composite oxide) according to the present invention is not particularly limited, but is preferably 10 to 100 nm and more preferably 20 to 90 nm. If the average crystal size is less than the lower limit, the composite oxide tends to easily cause phase separation within the temperature range (400 to 600° C.) for measuring the OSC. On the other hand, if the average crystal size is more than the upper limit, the sufficient OSC tends not to be obtained. Here, such an average crystal size can be calculated by using commercially available analysis software (for example, Rietveld analysis software named "Jana2006") from the X-ray diffraction pattern obtained using CuKα by the X-ray diffraction measurement.

Furthermore, a specific surface area of the composite oxide (the Ce—Zr-Ln-Ti-based composite oxide) according to the present invention is not particularly limited, but is preferably 1 to 50 $m^2/g$ and more preferably 5 to 20 $m^2/g$. If the specific surface area is less than the lower limit, the sufficient OSC tends not to be obtained. On the other hand, if the specific surface area is more than the upper limit, the composite oxide tends to easily cause phase separation within the temperature range (400 to 600° C.) for measuring the OSC. In this regard, such a specific surface area can be calculated as a BET specific surface area from an adsorption isotherm using the BET isotherm adsorption equation, and can be obtained for example by using a commercially-available fully-automated specific surface area measuring device (MicroSorp MODEL-4232 manufactured by Microdata).

In addition, the composite oxide according to the present invention preferably has a cation-ordered structure. Basically, the ceria-zirconia-based composite oxide has a fluorite structure. In this regard, the composite oxide (the Ce—Zr-Ln-Ti-based composite oxide) according to the present invention is preferably observed to have the superlattice peak of the diffraction line attributed to the (111) plane demonstrating that the cation-ordered structure is formed with the space group changed from the fluorite structure of Fm-3m to the cation-ordered structure of F-43m. The composite oxide according to the present invention tends to achieve further enhancement of the oxygen storage capacity (OSC), because the difference in ionic radius between the Zr site where the titanium is solid-dissolved and the Ce site where the rear-earth element is solid-dissolved causes cation ordering to form the oxygen site in which the bonding strength is relatively weak. Note that the space group of the cation-ordered structure is P312 or F-43m, in general. Assuming such a space group (P312 or F-43m) of the cation-ordered structure, the formation of the solid-dissolved phase having the cation-ordered structure can be confirmed by observing that a change in the lattice parameter demonstrates linearity.

Moreover, the composite oxide (the Ce—Zr-Ln-Ti-based composite oxide) according to the present invention preferably contains a pyrochlore phase. If the composite oxide according to the present invention contains the pyrochlore phase, the OSC tends to be enhanced further due to a reduction in the energy necessary to release the oxygen. Note that the space group of the pyrochlore structure is generally Fd-3m. The fact that the composite oxide contains the pyrochlore phase can be confirmed by the X-ray diffraction (XRD) measurement observing the presence of a peak originating from the pyrochlore structure (the peak appearing at a 2θ angle of 14.0° to 16.0° in the X-ray diffraction pattern using CuKα).

Then, the composite oxide (the Ce—Zr-Ln-Ti-based composite oxide) according to the present invention may further contain at least one element selected from the group consisting of alkaline earth elements. When the composite oxide according to the present invention further containing such an element is used as a support for a catalyst for purification of exhaust gas, the catalyst tends to exhibit higher exhaust gas purification performance. As such alkaline earth metal elements, there are magnesium (Mg), calcium (Ca), strontium (Sr), barium (Ba), and radium (Ra). Among them, Mg, Ca, and Ba are preferable from the viewpoint that the composite oxide tends to cause a strong interaction with a noble metal and thereby have a high affinity for the noble metal when the noble metal is supported on the composite oxide. Since such an alkaline earth metal element having low electronegativity causes a strong interaction with a noble metal, the element is bound to the noble metal via oxygen in an oxidation atmosphere, and thereby inhibits evaporation and sintering of the noble metal. Thus, the alkaline earth metal element tends to be able to sufficiently retard degradation of the noble metal, which is an active spot in exhaust gas purification.

In the case where the composite oxide further contains at least one element selected from the group consisting of alkaline earth elements, the content of the alkaline earth element is preferably 1 to 20% by mass, and more preferably 3 to 10% by mass in the composite oxide. If the content of the element is less than the lower limit, it tends to be difficult to sufficiently enhance an interaction of the obtained composite oxide with a noble metal when the noble metal is supported on the composite oxide. On the other hand, if the content of the element is more than the upper limit, the oxygen storage capacity tends to decrease.

An oxygen storage material of the present invention comprises the composite oxide (Ce—Zr-Ln-Ti-based composite oxide), and is capable of exhibiting a good oxygen storage capacity (OSC) even at a relatively low temperature of about 400° C. while having such good heat resistance as to achieve a sufficient reduction in deterioration of the oxygen storage capacity under exposure to a high temperature. For example, the rate of OSC deterioration after Heat-Resistance Test involving firing at 1100° C. for 5 hours in an ambient atmosphere is reduced to preferably at 80% or lower and more preferably at 70% or lower. For these reasons, the oxygen storage material of the present invention is favorably usable as a support or a promoter for a catalyst for purification of exhaust gas. A preferred application example using the oxygen storage material of the present invention is a catalyst for purification of exhaust gas comprising a support composed of the oxygen storage material of the present invention, and a noble metal supported on the support. As such a noble metal, there are platinum, rhodium, palladium, osmium, iridium, gold, silver, and so on. Moreover, in another application example, the oxygen storage material of the present invention is arranged around a catalyst for purification of exhaust gas in which a noble metal is supported on fine particles of another catalyst support.

Next, a method of the present invention for producing the oxygen storage material of the present invention is described.

The method for producing an oxygen storage material of the present invention comprises:

mixing, in a solvent, at least one cerium compound selected from the group consisting of chloride, nitrate, sulfate, acetate and oxide of cerium, at least one zirconium compound selected from the group consisting of chloride, nitrate, sulfate, acetate and oxide of zirconium, at least one rear-earth element-containing compound selected from the group consisting of chloride, nitrate, sulfate, acetate and oxide of a rear-earth element other than cerium, at least one titanium compound selected from the group consisting of chloride, nitrate, sulfate, acetate and oxide of titanium, and a hydrophilic organic compound; and obtaining the oxygen storage material of the present invention comprising the above-specified Ce—Zr-Ln-Ti-based composite oxide from the obtained mixture through a solution combustion synthesis.

If the target composite oxide further contains at least one element selected from the group consisting of alkaline earth elements, a compound of the element (at least one selected from chloride, nitrate, sulfate, acetate and oxide of the element) may be further added and mixed.

The solution combustion synthesis method employed in the present invention is a kind of liquid-phase redox reaction in which at least one metal compound selected from the group consisting of chloride, nitrate, sulfate, acetate and oxide of metals is used as an oxidant and a hydrophilic organic compound is used as a reductant (called a "fuel" in the solution combustion synthesis method). Specifically, raw materials (the oxidant and the fuel) are mixed in a solvent such as water, and the obtained mixture (solution or gel) is heated to cause rapid exothermic reaction between the oxidant and the fuel, and is directly subjected to combustion at a predetermined temperature, thereby obtaining a fine powder of the composite oxide of the used metal.

As the oxidant in the solution combustion synthesis method, the present invention uses:

at least one cerium compound selected from the group consisting of chloride, nitrate, sulfate, acetate and oxide of cerium;

at least one zirconium compound selected from the group consisting of chloride, nitrate, sulfate, acetate and oxide of zirconium;

at least one rear-earth element-containing compound selected from the group consisting of chloride, nitrate, sulfate, acetate and oxide of a rear-earth element other than cerium; and at least one titanium compound selected from the group consisting of chloride, nitrate, sulfate, acetate and oxide of titanium.

In addition, as the oxidant in the solution combustion synthesis method, the present invention preferably uses cerium nitrate, zirconium nitrate, nitrate of the rear-earth element (Ln), and titanium nitrate. The cerium nitrate is not particularly limited, but is preferably, for example, $Ce(NH_4)_2(NO_3)_6$. Then, the zirconium nitrate is not particularly limited, but is preferably, for example, $ZrO(NO_3)_2 \cdot 2H_2O$. Further, the nitrate of the rear-earth element (Ln) is not particularly limited, but is preferably, for example, $Ln(NO_3)_3 \cdot 6H_2O$. Additionally, the titanium nitrate is not particularly limited, but is preferably, for example, $TiO(NO_3)_2$.

Meanwhile, the hydrophilic organic compound used as the reductant (fuel) in the solution combustion synthesis method is not particularly limited, but is preferably glycine, glucose, urea, alanine, oxalyl hydrazine, and the like. Further, as the solvent in the solution combustion synthesis method, water is favorably used in general, an aqueous solution containing nitric acid ions (for example, an aqueous solution of ammonium nitrate) or a hydrophilic organic solvent such as ethanol may be used.

In the method for producing an oxygen storage material of the present invention, the oxidant and the reductant (fuel) are first mixed in the solvent. In this process, it is preferable that the metal compounds (a cerium compound, a zirconium compound, a rear-earth element-containing compound, and a titanium compound) used as the oxidant be mixed such that the metal atoms satisfy the stoichiometric ratio in accordance with the composition (target composition) of the target composite oxide.

In addition, what is important in the solution combustion synthesis method is the ratio between an oxidant and a reductant (fuel). In general, one indicator of the ratio is the molar ratio between the oxidant and the reductant (fuel) ([oxidant]/[reductant]) in a stoichiometry assuming that the oxidant is reduced to a metal or a metal oxide and the fuel is oxidized and eventually reduced to $CO_2$ and $H_2O$. This stoichiometric molar ratio varies depending on the kinds of the used oxidant and reductant. It is preferable to mix the oxidant and the reductant such that the molar ratio between the raw materials fed for the solution combustion synthesis (the molar ratio ([oxidant]/[reductant]) between the oxidant and the reductant (fuel) involved in the redox reaction can be close to the stoichiometric molar ratio. However, it is also possible to cause the reaction with an excess of the reductant (fuel), and remove unreacted substances during combustion reaction.

Moreover, the amount of the solvent in which the oxidant and the reductant (fuel) is mixed is not particularly limited, and may be any amount equal to or more than a minimum amount that allows the oxidant and the reductant to be dissolved. The amount of the solvent is preferably close to the minimum amount (approximately, 1 to 2 times the minimum amount).

Next, in the method for producing an oxygen storage material of the present invention, the mixture obtained by mixing the oxidant and the reductant (fuel) in the solvent is subjected to combustion reaction directly without sedimentation, thereby synthesizing the oxygen storage material of the present invention comprising the composite oxide. In this process, the mixture used in the combustion reaction is preferably a solution in which the used oxidant and reductant are dissolved in the solvent, but may be a gel in which intermediate product of the redox reaction is generated. In addition, the temperature and time of the combustion reaction are not particularly limited, but are preferably within a temperature range of 200 to 600° C. for approximately 1 to 5 hours. Moreover, the atmosphere for the combustion reaction is not particularly limited and may be the ambient atmosphere, but may also be an inert atmosphere such as argon, nitrogen, or helium.

EXAMPLES

Hereinafter, the present invention is described in further details based on Examples and Comparative Examples; however, the present invention is not limited to the following Examples.

The following reagents were used.
(1) Cerium nitrate: $Ce(NH_4)_2(NO_3)_6$ (purity: 99.5%, manufactured by Wako Pure Chemical Industries, Ltd.)
(2) Zirconium nitrate: $ZrO(NO_3)_2 \cdot 2H_2O$ (purity: 97%, manufactured by Wako Pure Chemical Industries, Ltd.)
(3) Lanthanum nitrate: $La(NO_3)_3 \cdot 6H_2O$ (purity: 99.9%, manufactured by Wako Pure Chemical Industries, Ltd.)
(4) Titanium raw-material compound: $Ti[(CH_3)_2CHO]_4$ (purity: 95%, manufactured by Wako Pure Chemical Industries, Ltd.)
(5) Nitric acid: $HNO_3$ (concentration: 65%, manufactured by Wako Pure Chemical Industries, Ltd.)
(6) Hydrophilic organic compound: glycine ($C_2H_5NO_2$) (purity: 99%, manufactured by Wako Pure Chemical Industries, Ltd.)
(7) Titania: $TiO_2$ (average particle size: 5 μm, purity: 99.9%, manufactured by Wako Pure Chemical Industries, Ltd.)

Preparation Example 1: Preparation of Titanium Nitrate

First, 10 g of the titanium-isopropoxide ($Ti[(CH_3)_2CHO]_4$) was dissolved in 300 mL of ion exchanged water, followed by hydrolysis reaction, and the precipitate obtained was washed three times with distilled water to obtain a $TiO(OH)_2$ powder. Next, 3.44 g of $TiO(OH)_2$ was dissolved in a minimum amount, specifically, 5 ml of nitric acid to obtain an aqueous solution of $TiO(NO_3)_2$ (concentration: 7 M).

Example 1

The target composition was set to $Ce_{0.4}La_{0.1}Zr_{0.4}Ti_{0.1}O_{1.95}$ (x=0.1 in the composition formula: $Ce_{0.5-x}La_xZr_{0.4}Ti_{0.1}O_{2-0.5x}$), and a composite oxide having the above-specified composition was obtained through the solution combustion synthesis method as specified below.

Specifically, to obtain the target composition, the cerium nitrate, the zirconium nitrate, the lanthanum nitrate, and the titanium nitrate at the stoichiometric ratio were dissolved in the amounts of feed presented in Table 1 into pure water in the minimum amount presented in Table 1 at ordinary temperature. After it was confirmed that the solution became transparent, glycine in an amount corresponding to two equivalents with respect to the total amount of cations and presented in Table 1 was dissolved to obtain a liquid mixture (solution). Subsequently, the obtained liquid mixture was put into an alumina crucible, followed by firing at 400° C. for 2 hours in the ambient atmosphere in a degreasing furnace to obtain a powder of a ceria-zirconia-lantana-titania composite oxide having the above-specified composition. The obtained powder had an average particle size of about 5 μm.

Example 2

The target composition was set to $Ce_{0.3}La_{0.2}Zr_{0.4}Ti_{0.1}O_{1.9}$ (x=0.2 in the composition formula: $Ce_{0.5-x}La_xZr_{0.4}Ti_{0.1}O_{2-0.5x}$), and a powder of a ceria-zirconia-lantana-titania composite oxide having the above-specified composition was obtained in the same manner as in Example 1 except that the amount of each reagent was changed to an amount presented in Table 1.

Example 3

The target composition was set to $Ce_{0.2}La_{0.3}Zr_{0.4}Ti_{0.1}O_{1.85}$ (x=0.3 in the composition formula: $Ce_{0.5-x}La_xZr_{0.4}Ti_{0.1}O_{2-0.5x}$), and a powder of a ceria-zirconia-lantana-titania composite oxide having the above-specified composition was obtained in the same manner as in Example 1 except that the amount of each reagent was changed to an amount presented in Table 1.

Example 4

The target composition was set to $Ce_{0.1}La_{0.4}Zr_{0.4}Ti_{0.1}O_{1.8}$ (x=0.4 in the composition formula: $Ce_{0.5-x}La_xZr_{0.4}Ti_{0.1}O_{2-0.5x}$), and a powder of a ceria-zirconia-lantana-titania composite oxide having the above-specified composition was obtained in the same manner as in Example 1 except that the amount of each reagent was changed to an amount presented in Table 1.

Comparative Example 1

The target composition was set to $Ce_{0.5}Zr_{0.4}Ti_{0.1}O_2$ (x=0 in the composition formula: $Ce_{0.5-x}La_xZr_{0.4}Ti_{0.1}O_{2-0.5x}$), and a powder of a ceria-zirconia-titania composite oxide having the above-specified composition was obtained in the same manner as in Example 1 except that the amount of each reagent was changed to an amount presented in Table 1.

Comparative Example 2

The target composition was set to $La_{0.5}Zr_{0.4}Ti_{0.1}O_{1.75}$ (x=0.5 in the composition formula: $Ce_{0.5-x}La_xZr_{0.4}Ti_{0.1}O_{2-0.5x}$), and a powder of a zirconia-lantana-titania composite oxide having the above-specified composition was obtained in the same manner as in Example 1 except that the amount of each reagent was changed to an amount presented in Table 1.

Comparative Example 3

The target composition was set to $Ce_{0.3}La_{0.2}Zr_{0.5}O_{1.9}$ (x=0.2 in the composition formula: $Ce_{0.5-x}La_xZr_{0.5}O_{2-0.5x}$), and a powder of a ceria-zirconia-lantana composite oxide having the above-specified composition was obtained in the same manner as in Example 1 except that the amount of each reagent was changed to an amount presented in Table 1.

Comparative Example 4

The powder (1.0000 g) of the ceria-zirconia-lantana composite oxide obtained in Comparative Example 3 and a titania powder (0.0547 g) were physically mixed at a molar ratio of 10:1 to obtain a mixture of the ceria-zirconia-lantana composite oxide and the titania (a mixture of $Ce_{0.3}La_{0.2}Zr_{0.5}O_{1.9}$ and $TiO_2$ corresponding to the composition formula: $Ce_{0.5-x}La_xZr_{0.4}Ti_{0.1}O_{2-0.5x}$ where x=0.2).

TABLE 1

| Reagent | Comp. Ex. 1 | Ex. 1 | Ex. 2 | Ex. 3 | Ex. 4 | Comp. Ex. 2 | Comp. Ex.3 | |
|---|---|---|---|---|---|---|---|---|
| $(NH_4)_2 Ce(NO_3)_6$ | 1.0000 | 0.8000 | 0.6000 | 0.4000 | 0.2000 | 0 | 0.6000 | g |
| $La(NO_3)_3 \cdot 6H_2O$ | 0 | 0.1580 | 0.3159 | 0.4739 | 0.6319 | 0.7898 | 0.3159 | g |

TABLE 1-continued

| Reagent | Comp. Ex. 1 | Ex. 1 | Ex. 2 | Ex. 3 | Ex. 4 | Comp. Ex. 2 | Comp. Ex.3 | |
|---|---|---|---|---|---|---|---|---|
| $ZrO(NO_3)_2 \cdot 2H_2O$ | 0.3900 | 0.3900 | 0.3900 | 0.3900 | 0.3900 | 0.3900 | 0.4875 | g |
| $TiO(NO_3)_2$ | 0.518 | 0.518 | 0.518 | 0.518 | 0.518 | 0.518 | 0 | ml |
| $C_2H_5NO_2$ (Glycine) | 0.5477 | 0.5477 | 0.5477 | 0.5477 | 0.5477 | 0.5477 | 0.5477 | g |
| $H_2O$ | 5.000 | 5.000 | 5.000 | 5.000 | 5.000 | 5.000 | 5.000 | ml |

<Heat-Resistance Test (Endurance Test)>

The composite oxides obtained in Examples and Comparative Examples were fired at 1100° C. for 5 hours in the ambient atmosphere to obtain samples after Heat-Resistance Test.

<X-Ray Diffraction (XRD) Measurement>

For each of the composite oxides obtained in Examples 1 to 4 and Comparative Examples 1 to 3 (samples before Heat-Resistance Test (pre-endurance)), and samples after Heat-Resistance Test (post-endurance) of them, the crystal phase was measured by an X-ray diffraction method. Here, X-ray diffraction patterns were measured under conditions of 40 KV, 40 mA, and 2θ=5°/min with the CuKα ray using the X-ray diffraction device under the trade name "RINT-Ultima" manufactured by Rigaku Corporation.

Figure 2:
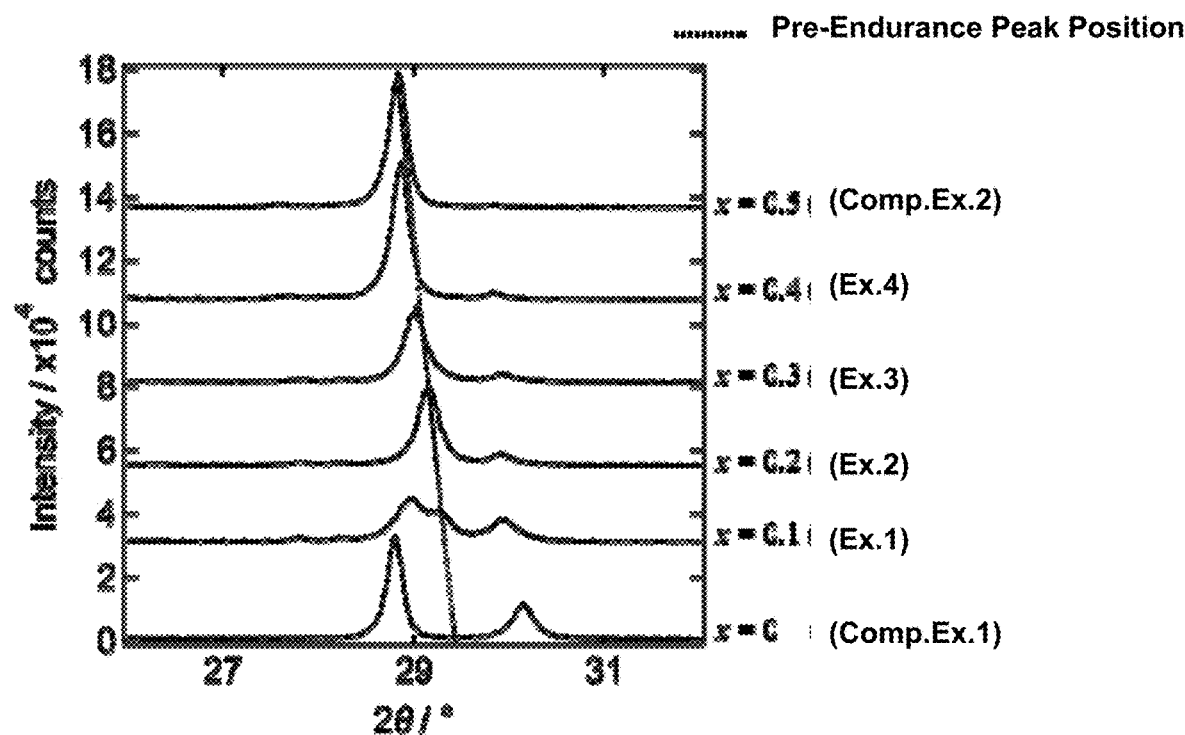
FIG. 2 is a graph presenting main peaks (patterns at 2θ=26 to 32°) of the X-ray diffraction patterns of the composite oxides obtained in Examples 1 to 4 and Comparative Examples 1 and 2 (after Heat-Resistance Test).

FIG. 1 presents the X-ray diffraction patterns obtained from the composite oxides (before Heat-Resistance Test) of Examples 1 to 4 and Comparative Examples 1 and 2. In addition, FIG. 2 presents main peaks (patterns at 2θ=26 to 32°) in the X-ray diffraction patterns obtained from the composite oxides (after Heat-Resistance Test) of Examples 1 to 4 and Comparative Examples 1 and 2.

Further, Table 2 presents a result of obtaining the ratio $\{(I_{111}/I_{222}) \times 100\}$ of the intensity ($I_{111}$) of the superlattice peak (2θ=14 to 16°) of the diffraction line attributed to the (111) plane to the intensity ($I_{222}$) of the main peak (2θ=28 to 30°) of the diffraction line attributed to the (222) plane from each of the X-ray diffraction patterns obtained from the composite oxides (before Heat-Resistance Test) in Examples 1 to 4 and Comparative Examples 1 to 3. Here, for the composite oxide obtained in Comparative Example 3, the superlattice peak was not observed, and the intensity ratio $\{(I_{111}/I_{222}) \times 100\}$ was 0%.

Figure 3:
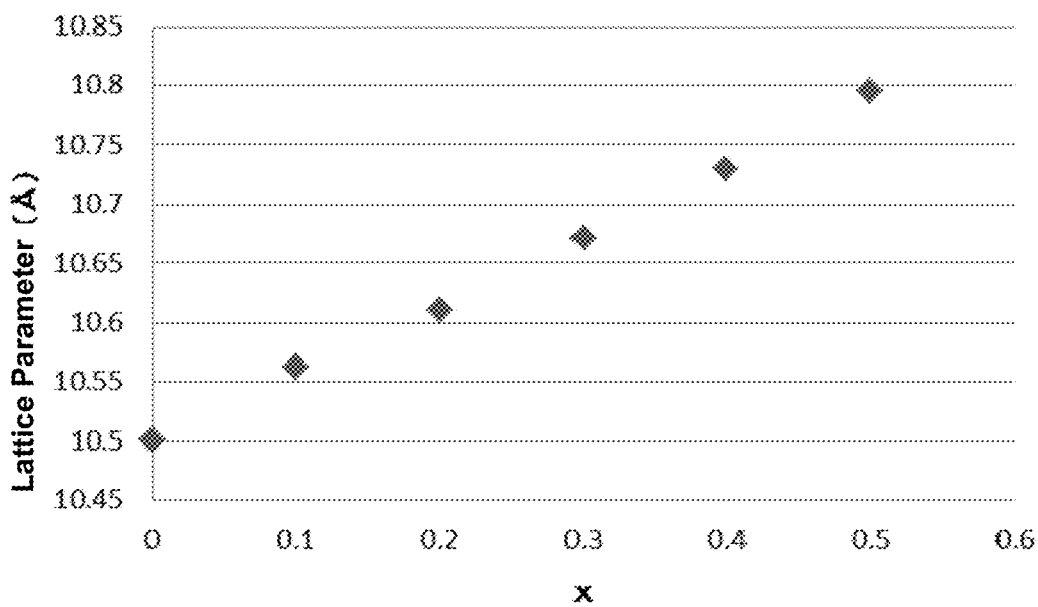
FIG. 3 is a graph presenting results of analyzing lattice parameters of the composite oxides obtained in Examples 1 to 4 and Comparative Examples 1 and 2.

In addition, the lattice parameter (lattice constant) was analyzed and the average crystal size was calculated using the Rietveld analysis software "Jana2006" from each of the X-ray diffraction patterns obtained from the composite oxides (before Heat-Resistance Test) in Examples 1 to 4 and Comparative Examples 1 to 3, and the results thus obtained are presented in Table 2. Here, the lattice parameter is a lattice parameter in the case of F-43m where the space group forms a cation-ordered structure. FIG. 3 presents an analysis result of the lattice parameters of the composite oxides obtained in Examples 1 to 4 and Comparative Examples 1 and 2.

<Measurement of Specific Surface Area>

The specific surface area (SSA) for each of the composite oxides (before Heat-Resistance Test) obtained in Examples 1 to 4 and Comparative Examples 1 to 3 was measured through a single point BET method using a fully-automated specific surface area measuring device (MicroSorp MODEL-4232 manufactured by Microdata), and the results thus obtained are presented in Table 2.

<Measurement of Oxygen Storage Capacity (OSC) and Rate of OSC Deterioration Due to Heat-Resistance Test>

Figure 4:
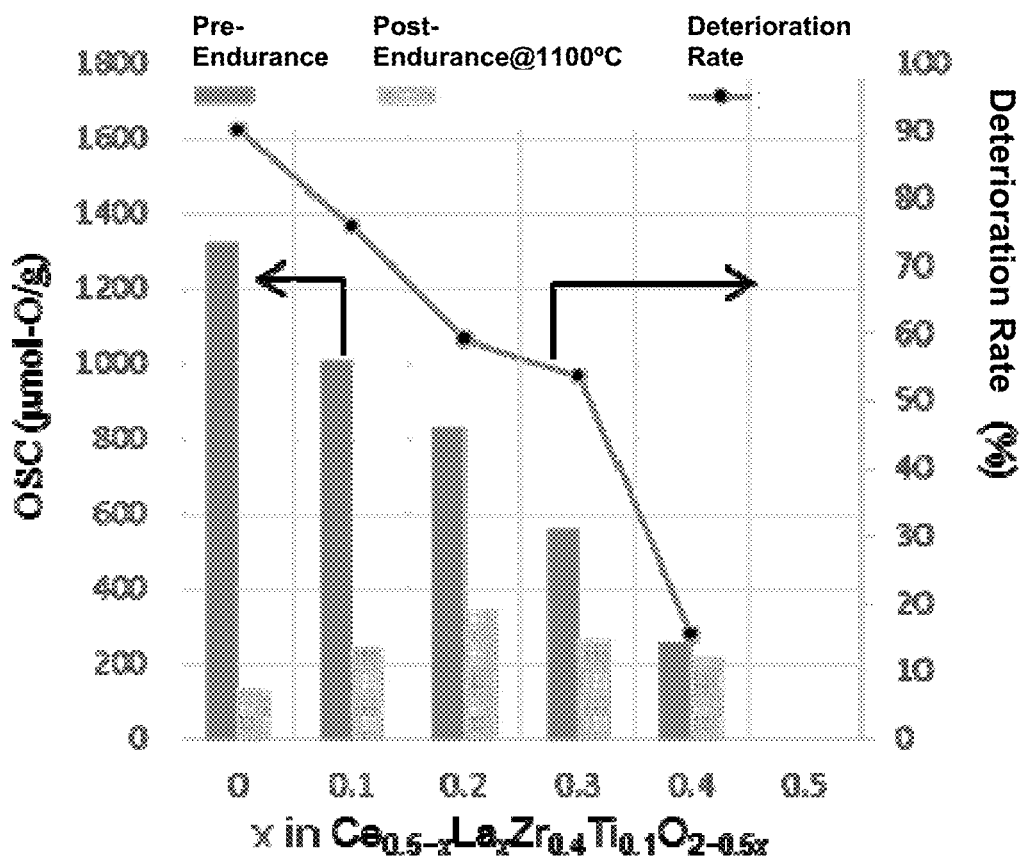
FIG. 4 is a graph presenting an oxygen storage capacity (OSC) at 400° C. and a rate of OSC deterioration due to Heat-Resistance Test of each of the composite oxides obtained in Examples 1 to 4 and Comparative Examples 1 and 2.

The composite oxides (before Heat-Resistance Test) obtained in Examples 1 to 4 and Comparative Examples 1 to 4 and the samples of them after Heat-Resistance Test were measured in terms of the oxygen storage capacity in the following way. Specifically, using an aqueous solution (concentration: 5% by mass) of tetraammine platinum hydroxide, the platinum compound was first supported on the powder of each composite oxide to be measured, followed by drying at 100° C. and heat treatment at 400° C. for 5 hours in the ambient atmosphere to obtain a sample powder in which the amount of platinum (Pt) supported was 1% by mass. Then, a thermogravimeter "TGA-50" (manufactured by Shimadzu Corporation) was used as a measuring device, and a lean gas ($O_2$ (10% by volume)+$N_2$ (balance)) and a rich gas ($H_2$ (10% by volume)+$N_2$ (balance)) were alternately caused to flow through 0.010 g of the sample powder under a condition of 400° C. by switching them every 5 minutes. The oxygen storage capacity was obtained from an average of the values of the increase in mass of the composite oxide measured three times. Thereafter, the rate of OSC deterioration (%) due to Heat-Resistance Test was obtained based on the oxygen storage capacities of the samples before Heat-Resistance Test (pre-endurance) and after Heat-Resistance Test (post-endurance) of the composite oxide. The obtained results are presented in Table 2. In addition, FIG. 4 presents the oxygen storage capacity (OSC) at 400° C. and the rate of OSC deterioration due to Heat-Resistance Test for each of the composite oxides obtained in Examples 1 to 4 and Comparative Examples 1 and 2.

TABLE 2

| | Comp. Ex. 1. | Ex. 1 | Ex. 2 | Ex. 3 | Ex. 4 | Comp. Ex. 2 | Comp. Ex. 3 | Comp. Ex. 4 |
|---|---|---|---|---|---|---|---|---|
| x | 0 | 0.1 | 0.2 | 0.3 | 0.4 | 0.5 | 0.2 | 0.2 |
| Lattice Parameter (Å) | 10.501 | 10.563 | 10.611 | 10.672 | 10.730 | 10.795 | 10.678 | — |
| OSC Before Heat-Resistance Test (μmol-O/g) @400° C. | 1320 | 1010 | 830 | 560 | 260 | 0 | 620 | 570 |
| OSC After Heat-Resistance Test (μmol-O/g) @400° C. | 130 | 245 | 340 | 260 | 220 | 0 | 300 | 260 |
| Deterioration Rate (%) | 90.2 | 75.7 | 59.0 | 53.6 | 15.4 | — | 51.6 | 54.4 |
| Average Crystal Size (nm) | 83.70 | 79.34 | 77.10 | 79.05 | 72.98 | 78.50 | 48.52 | — |
| Specific Surface Area (m²/g) | 8.73 | 7.24 | 9.82 | 10.26 | 8.01 | 8.90 | 11.58 | — |
| Superlattice Peak Intensity Ratio $I_{111}/I_{222}$ (%) | 2.7 | 2.7 | 3.8 | 3.4 | 3.5 | 3.5 | 0 | — |

<Evaluation Results of Composite Oxides>

As is apparent from the results presented in FIG. 1, for the composite oxide of the present invention obtained in each of Examples 1 to 4 through the production method of the present invention, the superlattice peak of the diffraction line attributed to the (111) plane was observed, which indicates that the cation-ordered structure was formed, and the ratio $\{(I_{111}/I_{222})\times 100\}$ of the intensity ($I_{111}$) of the superlattice peak of the diffraction line attributed to the (111) plane to the intensity ($I_{222}$) of the main peak of the diffraction line attributed to the (222) plane was also observed to be within a range of 1 to 5.

In addition, as presented in Table 2 and FIG. 3, the composite oxides of present invention obtained in Examples 1 to 4 demonstrate a better linearity of a change in the lattice parameter in the case of assuming the space group (F-43m) having the superlattice. Therefore, it was confirmed that the space group was changed from the fluorite structure Fm-3m to the cation-ordered structure F-43m. Moreover, since the presence of the peak originating from the pyrochlore structure (peak appearing at a 2θ angle of 14.0° to 16.0° in the X-ray diffraction pattern using CuKα) was observed in the X-ray diffraction (XRD) measurement, it was confirmed that the composite oxides contained the pyrochlore phase.

As is apparent from the results presented in Table 2 and FIG. 3, the composite oxides of the present invention obtained in Examples 1 to 4 demonstrated a linear increase in the lattice parameter along with an increase in the content of lanthanum ((x) for La in the composition) in accordance with Vegard's law, and therefore verified that the lanthanum and the titanium were sufficiently solid-dissolved in the ceria-zirconia composite oxide. Moreover, since these composite oxides were each observed to have no peaks corresponding to the oxides of the lanthanum and the titanium not solid-dissolved (peaks that appear at 2θ angles of 27.4° and 29.9° in the X-ray diffraction pattern using CuKα), it was confirmed that 90 at % or more of the lanthanum and titanium were solid-dissolved in the ceria-zirconia composite oxide.

Moreover, as is apparent from the results presented in FIG. 2, the ceria-zirconia-titania composite oxide obtained in Comparative Example 1 (La in the composition: x=0) demonstrated that the phase existent before Heat-Resistance Test was decomposed due to Heat-Resistance Test at 1100° C. and completely disappeared, whereas the composite oxide of the present invention obtained in Example 1 (La in the composition: x=0.1) demonstrated that the phase existent before Heat-Resistance Test was kept remaining even after Heat-Resistance Test, and the composite oxides of the present invention obtained in Examples 2 to 4 (La in the composition: x=0.2 to 0.4) demonstrated almost no decomposition of the phase existent before Heat-Resistance Test. These results confirmed that the production method of the present invention achieved remarkable enhancement of the heat resistance of the composite oxides of the present invention obtained in Examples 1 to 4.

Further, as is apparent from the results presented in Table 2 and FIG. 4, it was confirmed that the composite oxides of the present invention obtained in Examples 1 to 4 exhibited a good oxygen storage capacity (OSC) at a relatively low temperature of 400° C. even though the OSC tended to decrease with an increase in the amount of lanthanum solid-dissolved, and remarkably reduced the rate of OSC deterioration due to Heat-Resistance Test because these composite oxides of the present invention kept the sufficient OSC after Heat-Resistance Test.

On the other hand, in the case of the ceria-zirconia-lantana composite oxide obtained in Comparative Example 3 and not containing titanium, the superlattice peaks originated from the cation ordering were not observed and the OCS before Heat-Resistance Test was considerably worse than that of the composite oxide of the present invention obtained in Example 2. Moreover, even when the ceria-zirconia-lantana composite oxide obtained in Comparative Example 3 was physically mixed with the titania powder (Comparative Example 4), no enhancement of the OSC was observed, which supports the fact that the titanium does not contribute to the enhancement of the OSC unless the titania is solid-dissolved.

INDUSTRIAL APPLICABILITY

As described above, according to the present invention, it is possible to provide an oxygen storage material which is capable of exhibiting a good oxygen storage capacity (OSC) even at a relatively low temperature of about 400° C., and has such good heat resistance as to achieve a sufficient reduction in deterioration of the oxygen storage capacity under exposure to a high temperature, and to provide a method for producing the same.

Therefore, oxygen storage materials of the present invention obtained through the production method of the present invention are favorably usable as a support, a promoter, a catalyst atmosphere adjuster, and the like for catalysts for purification of exhaust gas.

What is claimed is:

1. An oxygen storage material comprising a Ce—Zr-Ln-Ti-based composite oxide containing cerium (Ce), zirconium (Zr), a rare-earth element (Ln: excluding cerium), and titanium (Ti), wherein
    at least part of the rare-earth element and at least part of the titanium are solid-dissolved in a composite oxide of the cerium and the zirconium, and
    the Ce—Zr-Ln-Ti-based composite oxide has a composition expressed by the following chemical formula (1):

$$Ce_{a-x}Ln_xZr_{b-y}Ti_yO_\delta \quad (1),$$

where a, b, x, and y are numbers satisfying conditions of a=0.4 to 0.6, b=0.4 to 0.6, x=0 to a (exclusive of x=0 and x=a), y=0 to 0.3 (exclusive of y=0), and a+b=1, and δ is a number of 1.7 to 2.2.

2. The oxygen storage material according to claim 1, wherein in an X-ray diffraction pattern of the Ce—Zr-Ln-Ti-based composite oxide obtained using CuKα by an X-ray diffraction measurement, a ratio ($I_{111}/I_{222}$) of an intensity ($I_{111}$) of a superlattice peak of a diffraction line attributed to a (111) plane to an intensity ($I_{222}$) of a main peak of the diffraction line attributed to a (222) plane satisfies the following condition (2):

$$1 \leq \{(I_{111}/I_{222})\times 100\} \leq 5 \quad (2).$$

3. The oxygen storage material according to claim 1, wherein the Ce—Zr-Ln-Ti-based composite oxide has a specific surface area of 1 to 50 m²/g, and has an average crystal size of 10 to 100 nm.

4. The oxygen storage material according to claim 1, wherein the Ce—Zr-Ln-Ti-based composite oxide has a cation-ordered structure and contains a pyrochlore phase.

5. A method for producing an oxygen storage material, comprising:
    mixing, in a solvent,
        at least one cerium compound selected from the group consisting of chloride, nitrate, sulfate, acetate and oxide of cerium, at least one zirconium compound selected from the group consisting of chloride, nitrate, sulfate, acetate and oxide of zirconium, at least one rare-earth element-containing compound selected from the group consisting of chloride, nitrate, sulfate, acetate and oxide of a rare-earth element other than cerium, at least one titanium compound selected from the group consisting of chloride, nitrate, sulfate, acetate and oxide of titanium, and a hydrophilic organic compound; and obtaining the oxygen storage material comprising the Ce—Zr-Ln-Ti-based composite oxide according to claim 1 from the obtained mixture through a solution combustion synthesis.

6. The method for producing an oxygen storage material according to claim 5, wherein in an X-ray diffraction pattern of the Ce—Zr-Ln-Ti-based composite oxide obtained using CuKα by an X-ray diffraction measurement, a ratio ($I_{111}/I_{222}$) of an intensity ($I_{111}$) of a superlattice peak of a diffraction line attributed to a (111) plane to an intensity ($I_{222}$) of a main peak of the diffraction line attributed to a (222) plane satisfies the following condition (2):

$$1 \leq \{(I_{111}/I_{222}) \times 100\} \leq 5 \tag{2}.$$

7. The method for producing an oxygen storage material according to claim 5, wherein the Ce—Zr-Ln-Ti-based composite oxide has a specific surface area of 1 to 50 m²/g, and has an average crystal size of 10 to 100 nm.

8. The method for producing an oxygen storage material according to claim 5, wherein the Ce—Zr-Ln-Ti-based composite oxide has a cation-ordered structure and contains a pyrochlore phase.

* * * * *